United States Patent
Jensen et al.

(10) Patent No.: US 11,501,021 B1
(45) Date of Patent: *Nov. 15, 2022

(54) HORIZONTALLY-SCALABLE DATA DE-IDENTIFICATION

(71) Applicant: SNOWFLAKE INC., Bozeman, MT (US)

(72) Inventors: David Jensen, Ouray, CO (US); Joseph David Jensen, Santa Clara, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/352,217

(22) Filed: Jun. 18, 2021

Related U.S. Application Data

(60) Provisional application No. 63/180,047, filed on Apr. 26, 2021.

(51) Int. Cl.
*G06F 16/00* (2019.01)
*G06F 21/62* (2013.01)
*G06F 16/22* (2019.01)

(52) U.S. Cl.
CPC ........ *G06F 21/6254* (2013.01); *G06F 16/221* (2019.01)

(58) Field of Classification Search
CPC ............... G06F 21/6254; G06F 16/221
See application file for complete search history.

(56) References Cited

U.S. PATENT DOCUMENTS

| | | | |
|---|---|---|---|
| 2010/0332537 A1* | 12/2010 | El Emam | G06F 21/6254 707/E17.131 |
| 2011/0258206 A1 | 10/2011 | El Emam et al. | |
| 2013/0291128 A1 | 10/2013 | Ito et al. | |
| 2019/0228183 A1* | 7/2019 | Choi | G06F 21/6254 |
| 2020/0065522 A1* | 2/2020 | Hapfelmeier | G06F 16/28 |
| 2021/0097203 A1* | 4/2021 | Isoda | G06F 16/24556 |

FOREIGN PATENT DOCUMENTS

CN          111695153 A  *  9/2020

OTHER PUBLICATIONS

Non-final office action dated Nov. 3, 2021 for U.S. Appl. No. 17/352,218.
Final office action dated Mar. 21, 2022 for U.S. Appl. No. 17/352,218.

\* cited by examiner

*Primary Examiner* — Ashish Thomas
*Assistant Examiner* — Suman Rajaputra
(74) *Attorney, Agent, or Firm* — Womble Bond Dickinson (US) LLP

(57) ABSTRACT

Generating an anonymized view for a data set is described. An example method can include receiving data from a data set, wherein the data is organized in a plurality of columns. The method may also include generating a plurality of generalizations of the data. The method may also further include selecting a generalization from the plurality of generalizations using an information loss scoring function based on at least a generalization information loss. Additionally, the method may also include generating an anonymized view of the data set from the selected generalization.

28 Claims, 12 Drawing Sheets

HORIZONTALLY-SCALABLE DATA DE-IDENTIFICATION

RELATED APPLICATIONS

This application claims the benefit of U.S. Provisional Application No. 63/180,047, filed Apr. 26, 2021, which is hereby incorporated by reference in its entirety.

TECHNICAL FIELD

The present disclosure relates to data processing and, in particular, to de-identifying data.

BACKGROUND

De-identification or anonymization is the "process by which personal data is irreversibly altered in such a way that a data subject can no longer be identified directly or indirectly, either by the data controller alone or in collaboration with any other party". Risk based anonymization (or de-identification) is based on reducing the risk of re-identification while maximizing data utility. Re-identification is the process by which anonymized data is matched with its true owner. For example, a researcher was able to link an easily purchased voter registration list with "anonymized" hospital data. The hospital data had only removed the names of the patients but their date of birth, gender and zip code were still in the data. The researcher showed that these three attributes were enough to re-identify 87% of the US population.

One way to anonymize data is called k-Anonymity. k-Anonymity modifies direct-identifiers and indirect- or quasi-identifiers such that each individual record has at least k−1 other records in common with matching quasi-identifiers.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
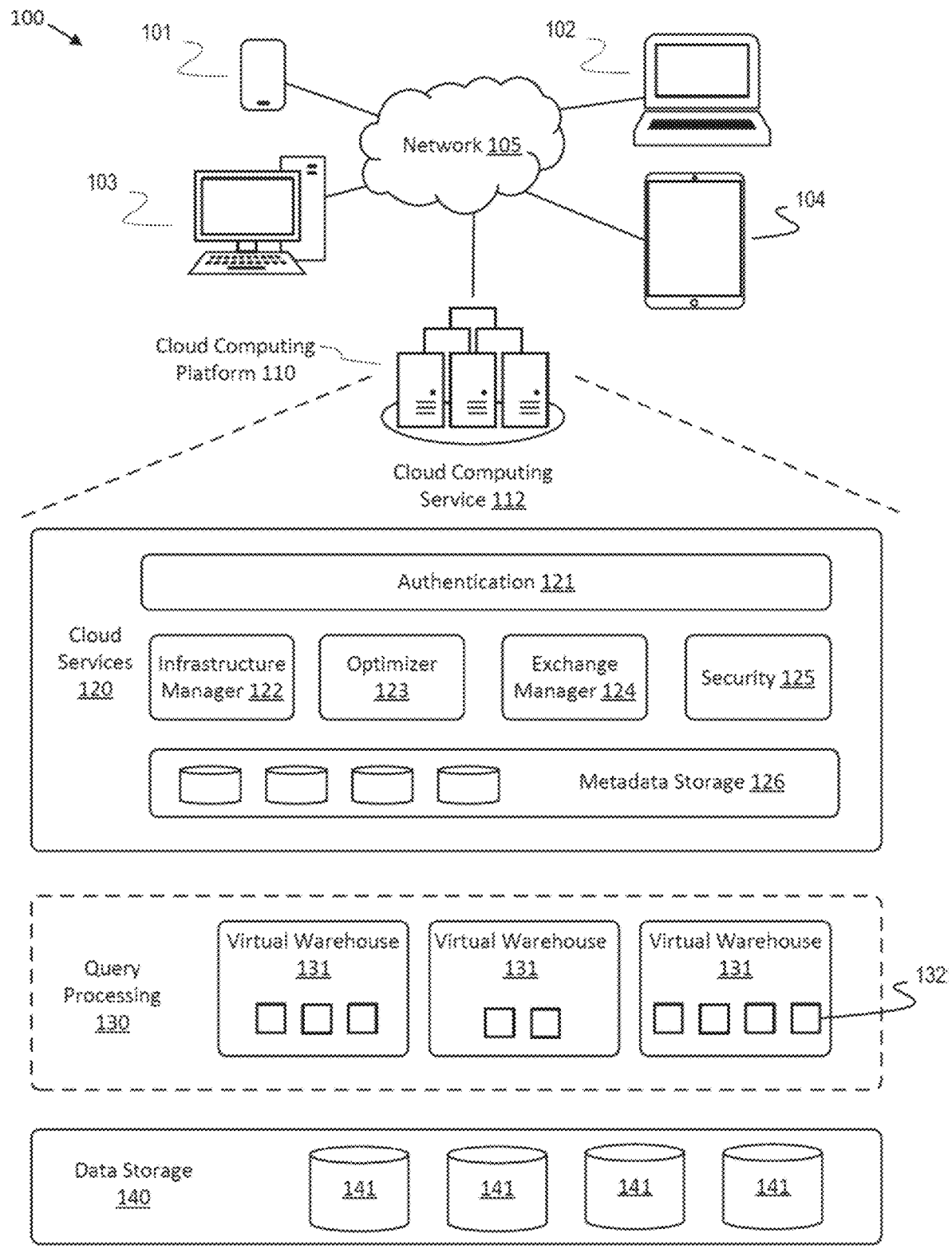
FIG. 1 is a block diagram depicting an example computing environment in which the methods disclosed herein may be implemented.

In the described systems and methods, a data storage system utilizes an SQL (Structured Query Language)-based relational database. However, these systems and methods are applicable to any type of database using any data storage architecture and using any language to store and retrieve data within the database. The systems and methods described herein further provide a multi-tenant system that supports isolation of computing resources and data between different customers/clients and between different users within the same customer/client.

One way to anonymize data is called k-Anonymity. k-Anonymity modifies direct-identifiers and indirect- or quasi-identifiers such that each individual record has at least k−1 other records in common with matching quasi-identifiers. The groups of records with matching quasi-identifiers are known as equivalence classes. Transformation of the data fully redacts direct identifiers while quasi-identifiers are generalized or suppressed to satisfy the k constraint while minimizing information loss. This is an NP-hard problem largely because the search space grows exponentially in the number of quasi-identifiers and the objectives are neither convex nor continuous. In one embodiment, a cloud computing platform can create an anonymized view of a data set, where the view is k-anonymized. In this embodiment, k-anonymization is NP-hard even with the restrictions imposed by full domain generalization.

In one embodiment, heuristics can be employed to both organize the search over the solution space of full domain generalization as well as use information gathered during the search to eliminate generalizations without having to evaluate them. This process of elimination is called pruning and exploits the monotonicity properties of full domain generalization as well the monotonicity property of the utility of feasible solutions together with a known lower bound on that value. If a generalization cannot be pruned, then the generalization is evaluated.

In this embodiment, a cloud computing platform retrieves data from a data set, where the data is columnar data or can be extracted or transformed into columnar data. The cloud computing platform further transforms the data in the data sets into integer data. In a further embodiment, the cloud computing platform transforms data that are organized in columns with a privacy category of quasi-identifiable. Data in other columns with a different privacy category are not transformed, but instead are ignored or suppressed. This allows the cloud computing platform to store a smaller amount of data for the anonymization view determination. In addition, data from one or more data hierarchies are further transformed into integer data and is used to create multiple generalizations of the transformed data.

Using the transformed data, the cloud computing platform creates a set of generalizations. In one embodiment, a generalization is a process of organizing column values into groups and replacing all the values in a group with a more general value. In this embodiment, the cloud computing platform creates the generalization set using one or more data hierarchies that are related to the transformed data. With the generalization set, the cloud computing platform performs a search to determine a candidate generalization that is used to create the anonymized view. While in one embodiment, the cloud computing platform can search the generalization set for the best candidate generalization, in alternative embodiments, the cloud computing platform can group one or more generalizations into one or more equivalence classes. Furthermore, the cloud computing platform can prune the generalizations, so that fewer generalizations need to be evaluated.

With the generalization set, the cloud computing platform can create a set of equivalence classes of the generalization. In one embodiment, a linked list data structure is used to store equivalence classes. Further generalizations of a previously computed set of equivalence classes can be done by merging those computed equivalence classes. There are several mechanisms for exploiting that within the code. The work done is proportional to the number of equivalence classes before the merge. That number decreases with generalization and, in practice, is often much smaller than the number of records.

In addition, the cloud computing platform can prune the number of equivalence classes that are to be evaluated. In one embodiment, three prefix list data structures can be used to store the properties of evaluated generalizations. The properties stored are the ones to support pruning. For example, if a generalization is k-anonymous, each coarser generalization is both k-anonymous and has lower utility (e.g., higher information loss). This processing is proportional to the number of generalizations evaluated. The property stored for the previously evaluated generalization will be that it is k-anonymous (e.g., heights of the hierarchies). In practice, most of the generalizations are eliminated in the pruning. Nonetheless, for k-anonymization, the number of generalizations evaluated may easily be in the thousands and each evaluation may require a pass over the data.

By using the reduced set of generalizations, there are less generalizations that the cloud computing platform uses to determine a candidate generalization. The cloud computing platform then uses the candidate to create the anonymized view of the data set.

In one embodiment, the cloud computing platform can use multiple processors to compute the candidate generalization. One problem using multiple processors to compute the candidate generalizations is that each of the processors need data from each of the other processors. This is due to a loss function that is used in the computation, where the loss function depends on an equivalence class size and a suppression factor. Each of these components depend on data being computed by each of the other processors. If the processors share memory, then the data transfers between the different processors is not a burden to the computations. However, if the processors do not share memory, (e.g., in a distributed database system, such as a distributed cloud database system), the amount of resources used to send data between processors severely slows down the computations of the candidate generalizations because the data transfers times are greatly increased for distributed memory parallel systems. For example and in one embodiment, in a 100 processor distributed memory system (e.g., 100 nodes in a distributed database system), each of the processors requires data from the other 99 processors. In addition, there can be a single processor, which is a master, that receives the information from the worker processors to schedule subsequent work. The amount of information communicated is proportional to the number of equivalence classes times the number of quasi-identifiers. Thus, the amount of data transferred between the different processors can severely slow down the parallelization of the candidate generalization computation. In this embodiment, the computations for the suppression and the equivalence class size are parts of the candidate generalization that slows that require the data from each of the different processors.

In a further embodiment, the cloud computing platform makes approximations for the suppression and equivalence class calculations that reduce the dependency on data from other processors. In this embodiment, the equivalence class calculation is approximated by computing a bound for the equivalence class size. By approximating the equivalence class size, the problem of computing the equivalence class size becomes separable, allowing the processors to compute the equivalence class size concurrently. In addition, the cloud computing platform approximates the suppression component. With these approximations, the cloud computing platform can have each of the processor compute three numbers (equivalence class size approximation, suppression approximation, and loss), report these numbers to a master node, where the master node determines the best solution for the minimum and set the values by processing the candidates.

FIG. 1 is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™ or GOOGLE CLOUD PLATFORM™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g., SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 110. These services tie together all of the different components of the cloud computing service 110 in order to process user requests, from login to query dispatch. Cloud services 120 may operate on compute instances provisioned by the cloud computing service 110 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security 125 engine, and metadata storage 126.

In one embodiment, the cloud computing service 112 can anonymize a data set based on the contents of the data in the data set. In this embodiment, the cloud computing service 112 retrieves data from a data set, where the data is organized in a plurality of columns. The cloud computing service 112 can further transform a subset of data into an integer data. The cloud computing service 112 can further determine a set of generalizations from the data subset and determine a candidate generalization. Additionally, the cloud computing service 112 generates an anonymized view using the candidate generalization.

Figure 2:
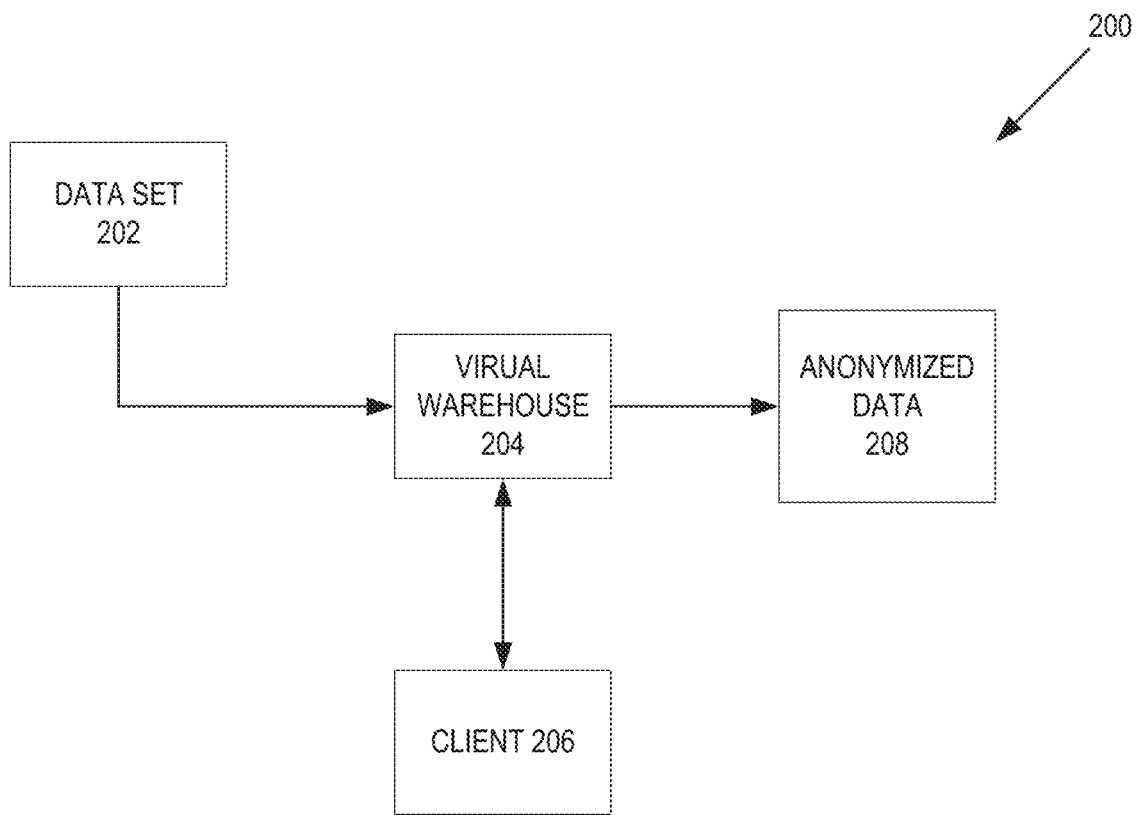
FIG. 2 is a schematic block diagram of one embodiment of anonymizing an input data set.

FIG. 2 is a schematic block diagram of one embodiment of a system 200 that performs an anonymization operation on a data set. In FIG. 2, system 200 includes a cloud computing platform 204 that retrieves a data set 202 and anonymizes that data set 202 to give an anonymized data set 206. In one embodiment, the data set can be any type of data set stored in columns or can be converted into columnar data (e.g., JavaScript Object Notation, key-value data, and/or other types of stored data). In a further embodiment, the cloud computing platform 204 is a computing platform that offers a variety of data processing and/or storage services, such as cloud computing platform 110 described in FIG. 1 above. In another embodiment, the client 206 is a personal computer, laptop, server, tablet, smart phone, and/or another type of device that can process data. In this embodiment, the client 206 can request the anonymization of the data set 202. In addition, the client 206 can present intermediate results and allow a user to alter the results. For example, and in one embodiment, the client can present semantic categories and/or semantic category types for each of the columns of the data set. A user may modify the semantic categories and/or the semantic category types for one or more of the columns and the cloud computing platform 204 can re-anonymize the data set. In one embodiment, the anonymized data 208 is columnar data, organized using the columns determined by the cloud computing platform 204.

In one embodiment, each of the columns in the data set will have a semantic category. In this embodiment, the semantic category is a description of the data in the column. For example, and in one embodiment, the semantic category can be name, gender, age, zip, city, education, and/or another type of semantic category. With the semantic category assigned, a privacy category can be assigned to each column. In one embodiment, a privacy category for the data is based on the semantic category designation. In this embodiment, there are at least four different kinds of privacy categories: identifier, quasi-identifier, sensitive, and other. In another embodiment, there can be other types of the privacy categories. In one embodiment, the privacy categories indicate how the data is to be treated during the anonymizing operation. For example, and in one embodiment, data having a privacy category of identifier is suppressed during the anonymizing operation. Identifier data is data that can identify a person or thing, such as a name, email or phone number. Thus, if identifier data survives the anonymizing operation, the anonymity will be lost. Sensitive data, such as medical results, is a type of data that is not to be revealed for moral or legal reasons. Sensitive data is typically protected by placing constraints on this data distribution within the equivalence classes—For example, l-diversity and t-closeness. Quasi-identifiers are attributes that may not identify a person or thing by themselves, but may uniquely identify an individual in combination. For example, an age, gender, and zip may be able to identify an individual alone or in combination with other publicly available data. Data with a privacy category of other is not transformed.

Figure 3:
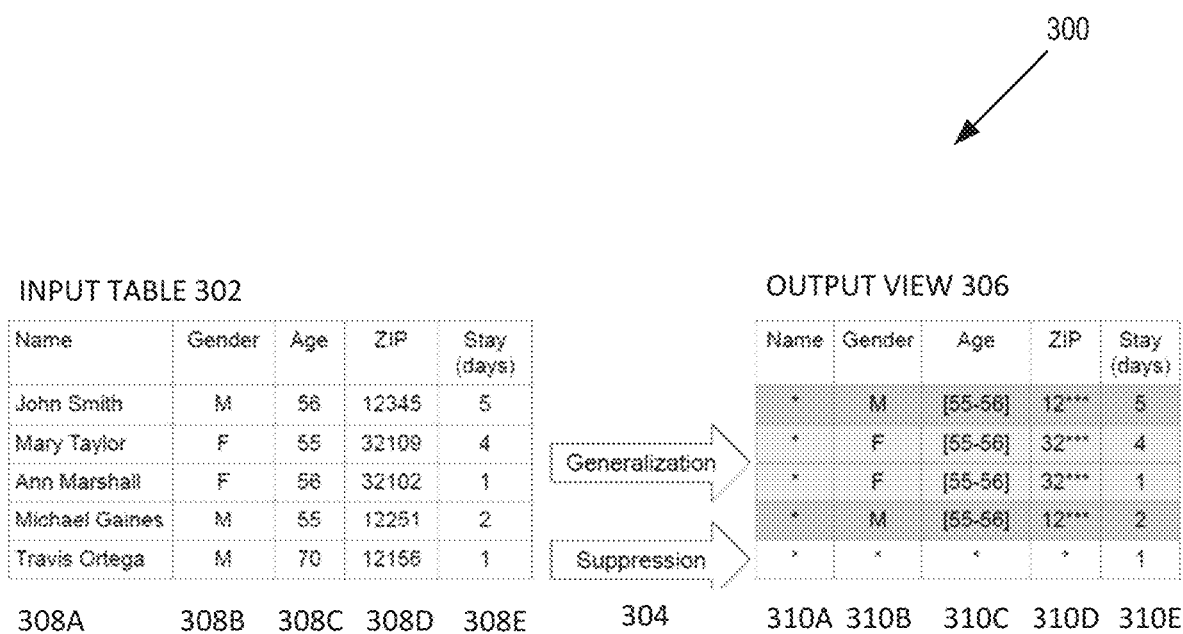
FIG. 3 is a schematic block diagram of one embodiment of an anonymization operation of an input table to produce an output table.

FIG. 3 is a schematic block diagram of one embodiment of an anonymization operation of an input table 302 to produce an output table 308. In FIG. 3, the input table 302 includes columns for name 308A, gender 308B, age 308C, zip code 308D, and stay 308E. In one embodiment, a classifier identifies the columns for name 308A as an identifier, columns age 308C and zip 308D as quasi-identifiable, and the columns gender 308B and stay 308E as other (e.g., not identifier, quasi-identifier, or sensitive). The anonymizing operation performs two different operations to anonymize the data: generalization and suppression (304). Generalization generalizes the data using a k-anonymity operation using a data hierarchy or another type of operation.

Generalization is further discussed in FIG. 5 below. Suppression prevents the data from being viewed. In FIG. 3, suppression is applied to the name column, resulting in no data being visible in name column 310A of output view 306. Column 310B-D (age and zip code) are generalized. For example, and in one embodiment, the age data is converted from a specific age to an age range in column 310C and the zip code data is generalized by removing the last three digits of the zip code. Other types of quasi-identifier data can be generalized in different ways. In one embodiment, quasi-identifier data can be generalized using a data hierarchy. In one embodiment, a data hierarchy is a successive grouping of data values culminating in a single value with the property that all values are successively grouped the same number of times, called the height of the hierarchy. Because the gender and stay columns are classified as other, this data is generally not transformed.

In one embodiment, if a row includes data that cannot be generalized into a group, then that row is suppressed. For example, and in one embodiment, the row with the name of Travis Ortega has an age of 30 that is outside of the age range of 55-56 and there is only one person in or around the age of 30. Because there is only one person in this age group, this row is suppressed in the output table 306 (except for the data in the stay column 310E).

Figure 4:
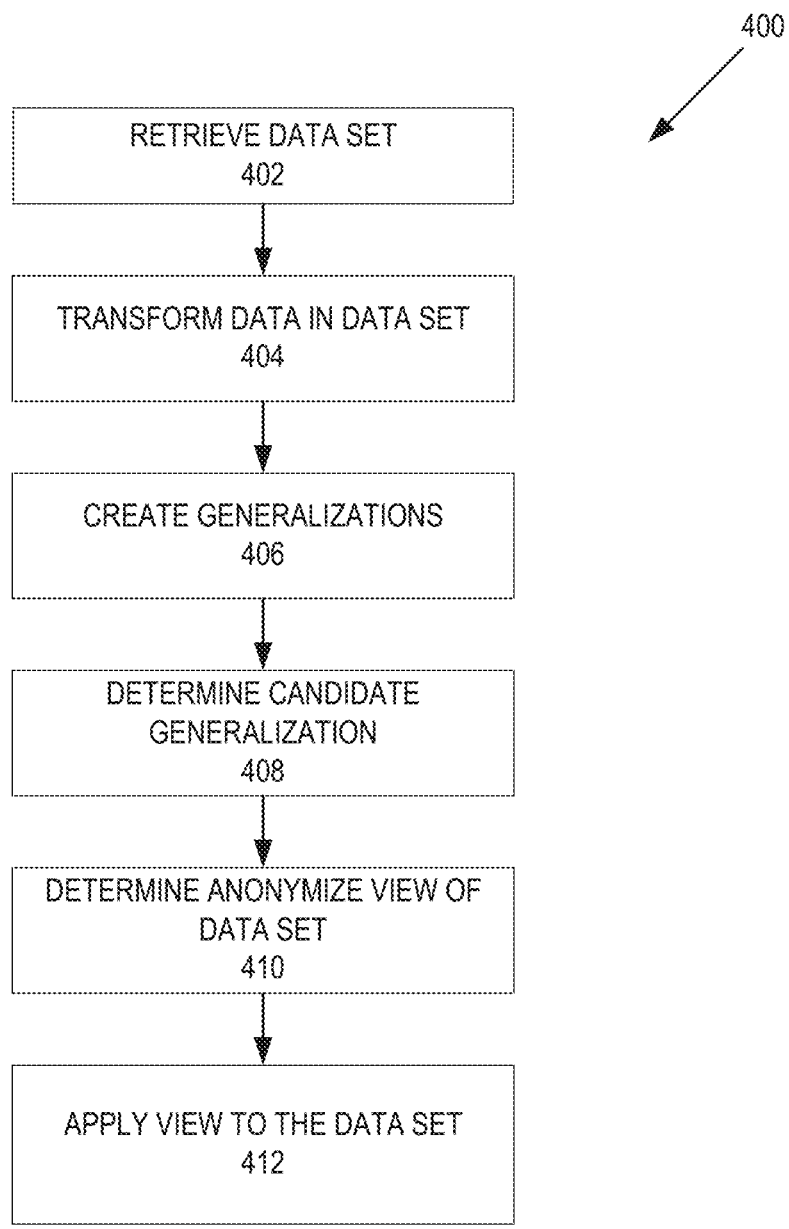
FIG. 4 is a flow diagram of one embodiment of a method to perform an anonymization operation of a data set.

FIG. 4 is a flow diagram of one embodiment of a method 400 to perform an anonymization operation of a data set. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing 130. Method 400 may begin at step 402, where the processing logic retrieves the data set. In one embodiment, the data set is columnar data or can be extracted or transformed into columnar data.

At step 404, processing logic transforms the data in the data set into integers. In one embodiment, data used to formulate a k-anonymization problem is integer data. Even though the original customer data to be anonymized has various types—strings, integers, floats—the mathematical representation replaces original data values with integers. In one embodiment, processing logic, for each quasi-identifier and the values in the associated hierarchy, replaces the data values with an index to a table storing the data value. Thus, a table that is used for k-anonymization can carry the information about quasi-identifiers. Transforming a data into this form can be done in SQL and is done once and requires passes over the hierarchies and quasi-identifiers. Because the transformed data is from the columns with quasi-identifier privacy categories, the data is much smaller than the original data. The steps that create the generalizations and process those generalizations, use the transformed integer data.

Processing logic generates multiple generalizations at step 406. In one embodiment, processing logic uses one or more data hierarchies to create the generalizations. In one embodiment, a generalization of the data set is a process of organizing column values into groups and replacing all the values in a group with a more general value. At step 408, processing logic determines a candidate generalization from the generalization set. In one embodiment, processing logic generates the candidate generalizations by searching the generalization set for a generalization that satisfies a k-anonymity level and minimizes an information loss function. In addition, processing logic can reduce the amount of processing resources used for determining a candidate generalization by grouping the generalizations into equivalence classes and pruning those equivalence classes. For example, and in one embodiment, processing logic can create a set of equivalence classes of the generalization. In one embodiment, a linked list data structure is used to store equivalence classes. Further generalizations of a previously computed set of equivalence classes can be done by merging those computed equivalence classes. There are several mechanisms for exploiting that within the code. The work done is proportional to the number of equivalence classes before the merge. That number decreases with generalization and, in practice, is often much smaller than the number of records.

In addition, processing logic can prune the number of equivalence classes that are to be evaluated. In one embodiment, three prefix list data structures can be used to store the properties of evaluated generalizations. The properties stored are the ones to support pruning. For example, if a generalization is k-anonymous, each coarser generalization is both k-anonymous and has lower utility (e.g., higher information loss). The property data structures can grow as each generalization is evaluated. Thus, the work associated with determining the inferred properties is proportional to the number of generalizations evaluated so far. For example, and in one embodiment, a property stored for the previously evaluated generalization will be that it is k-anonymous. In practice, most of the generalizations are eliminated in the pruning. Nonetheless, for k-anonymization, the number of generalizations evaluated may easily be in the thousands and each evaluation may require a pass over the data.

Figure 9:
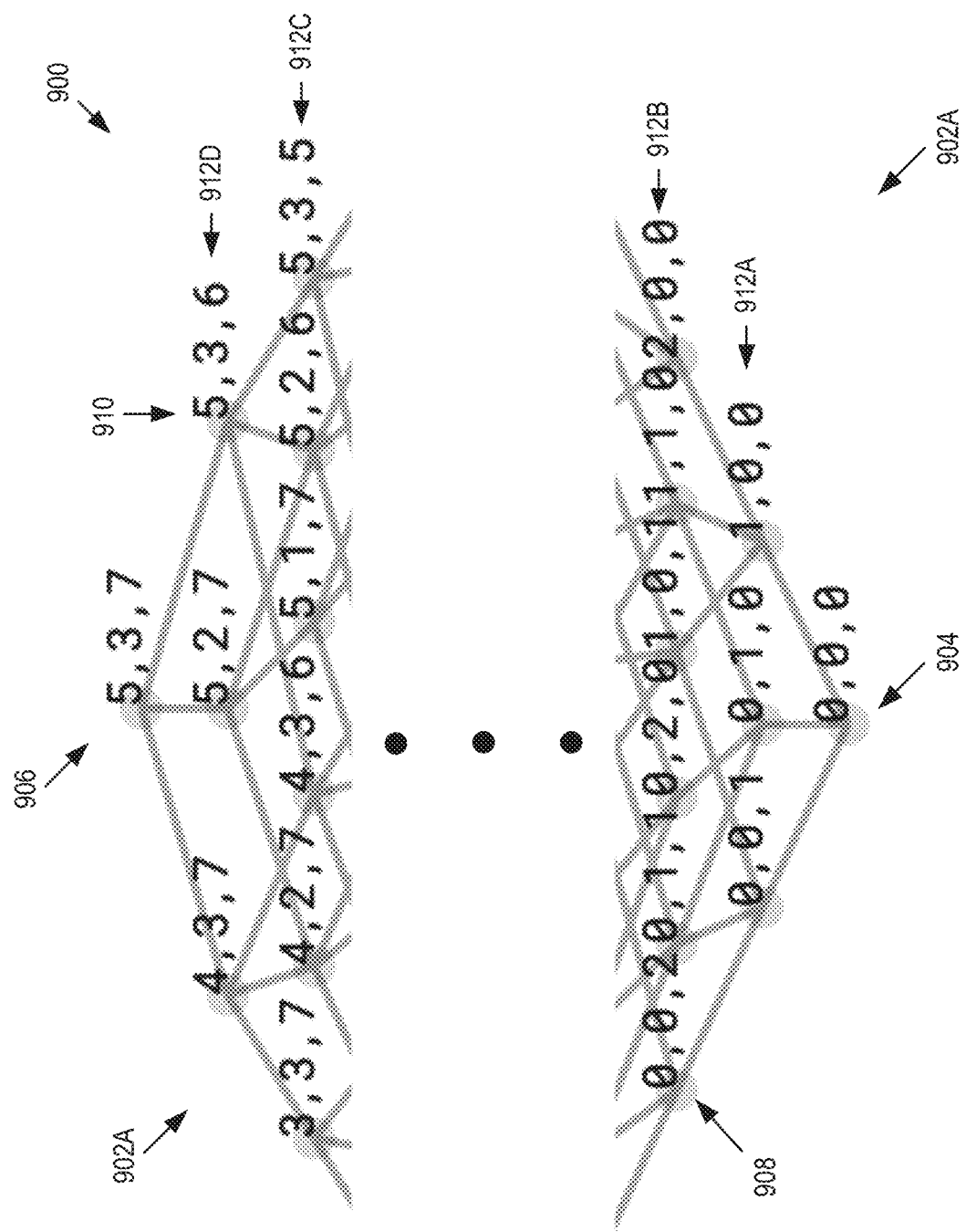
FIG. 9 is an illustration of one embodiment of a generalization lattice.

In one embodiment, process 400 generates a lattice of possible generalizations. In this embodiment, the lattice of generalizations is a representation of a solution space for N columns of quasi-identifier data having the same or different levels of generalizations. Each node in the lattice represents different levels of generalizations for the N quasi-identifier data. An example lattice is illustrated FIG. 9. FIG. 9 is an illustration of one embodiment of a generalization lattice 900. In FIG. 9, the lattice 900 is a representation of a solution space for three columns of quasi-identifier data. Each node of lattice 900 represents a different level of generalization for the three different columns. For the sake of clarity, the lattice 900 is illustrated 900 with the top part of the lattice 902A and the bottom part 902B. One skilled in the art would recognize that the lattice middle represents many further generalization levels.

In one embodiment, the lattice 900 includes many nodes, where each node is a tuple representing a different combination of generalizations of the three columns of data. In this embodiment, the 900 has a bottom node 904 that represents no generalizations at all and a top node 906 that represents a full generalization. The tuple for each node is the number of generalizations for each column using a data hierarchy corresponding to that column. For example, and in one embodiment, node 908 has the tuple (0,0,2) which represents no generalizations for column one and two and two levels of generalizations for column three. Similarly, node 910 has the tuple (5,3,6) that represents five levels of generalizations for column one, three levels of generalizations for column two, and six levels of generalizations for column three. Each level of the lattice 900 represents a collective level of generalization of the three columns, which can be satisfied with different combinations of individual column generalizations. For example, and in one embodiment, levels 912A-D represent collective levels of generalizations of one, two, 13, and 14, respectively. In one embodiment, process 400 uses the lattice 900 to find an optimal level of generalization for the k-anonymity. While in one embodiment, the lattice 900 is illustrated with three quasi-identifiable columns of data having data hierarchies of five, three, and seven levels, in alternative embodiments, there can be more or less columns with each having the same or different levels of data hierarchies.

At step 410, processing logic determines an anonymized view of the data set. In one embodiment, processing logic determines the anonymized view by using the candidate generalization. In this embodiment, processing logic uses privacy categories to determine whether to suppress the individual data, anonymize the individual data, or ignore. In one embodiment, the candidate generalization determines a level of generalization for each column of data that has a quasi-identifier privacy category. Processing logic applies the view at step 412.

Figure 5:
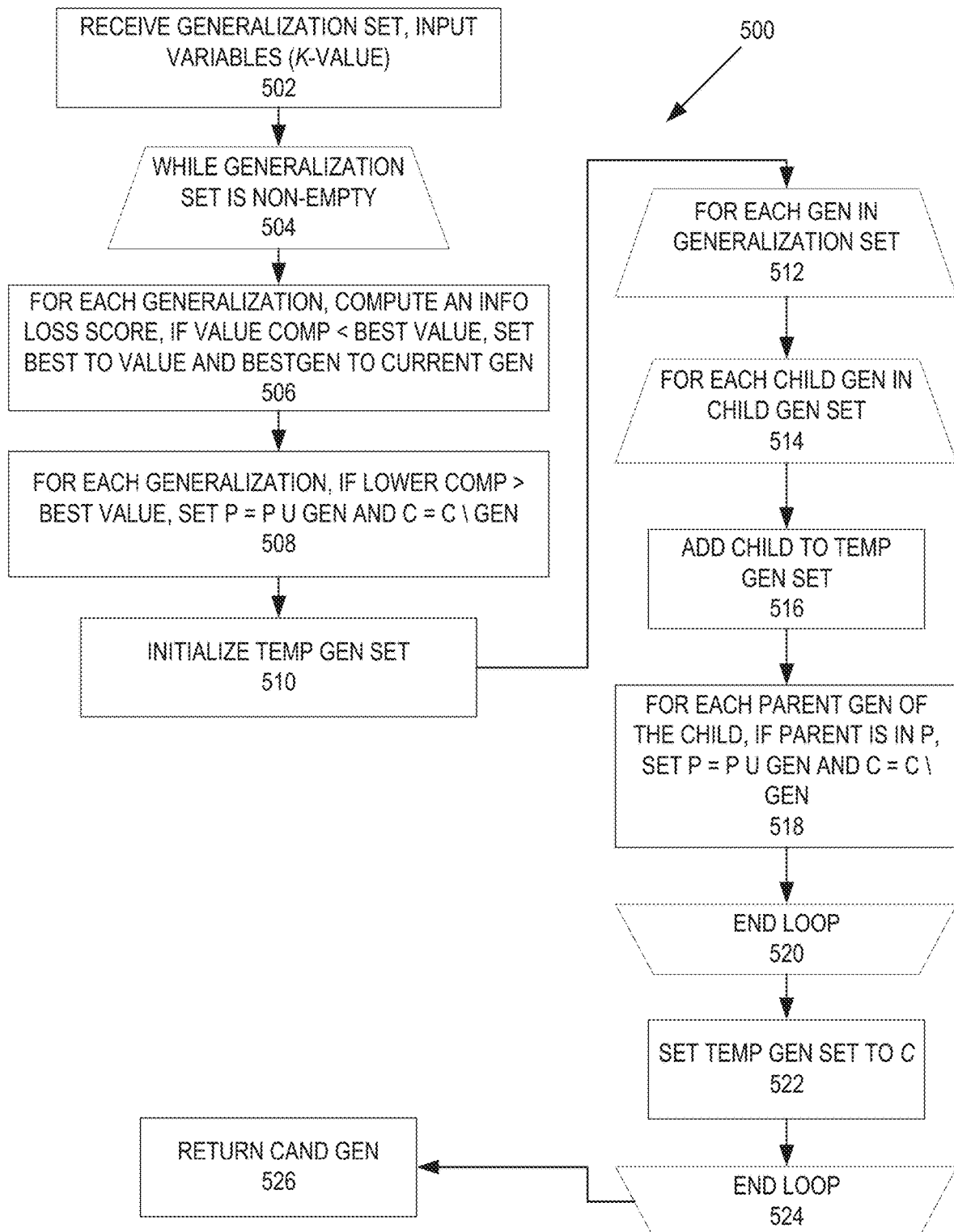
FIG. 5 is a flow diagram of one embodiment of a method to determine a candidate generalization from multiple generalizations.

FIG. 5 is a flow diagram of one embodiment of a method 500 to perform an anonymization operation of a data set. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing 130. Method 500 may begin at step 502, where the processing logic receives the generalization set, the corresponding data hierarchies, and the input variables (e.g., the k-value, average equivalence class size, acceptable information loss, acceptable level of suppression, and/or other types of input variable). In one embodiment, the data set is transformed columnar data that has a privacy category of quasi-identifier. Processing logic further initializes the variable best=$\min_{c \in C}$(score(k, c)), sets the variable bestgeneralization=$\text{argmin}_{c \in C}$(score(k, c)), and sets P to be the null set. In one embodiment, P is the set of pruned generalizations.

Processing logic performs an outer processing loop (steps 504-520) to determine a candidate generalization while C is a non-empty set. At step 506, for each generalization in the input generalization set, processing logic computes an information loss score for the generalization. In one embodiment, the information loss function that estimates an amount of information that is lost for that generalization as compared with the original data corresponding to the generalization. In this embodiment, that information loss function is the result of scoring this generalization with the privacy parameter, k. In one embodiment, the information loss function, score, where score: $C \times Z \rightarrow R^2$ so the (lower, value)=score(k,c) is the result of scoring the generalization c with the privacy parameter k. The sub-function lower is monotone, for fixed k, increasing over the partial order induced by the lattice and lower$\le$value for the c in the generalization set C. Processing logic further compares value with the best value. If value<best, processing logic sets best=value and bestgeneration=c, where bestgeneration is the current candidate generalization and best is the information loss function score for the current candidate generalization.

In one embodiment, the loss function is computed using the following formula:

$$\prod_{d=0}^{nd-1} \left(1 + \beta_d \times \sum_{j=1}^{p} \sum_{h=0}^{h_d-1} l_d^h \times \bar{s}_j[d][level_d]\right)^{1/nd} - \alpha_d -$$

$$1 + \hat{\sigma} \sum_{j=1}^{p} S_k(D_j, l) + \hat{\rho} \sum_{j=1}^{p} |E(D_j, l)|$$

where $\sum_{j=1}^{p} |E(D_j, l)|$ is the component to approximate the equivalence class size and $$\sum_{j=1}^{p} S_k(D_j, l)$$

is the component to approximate the number of suppressed records. In this embodiment, computing these components for partitions of the equivalence classes $D_j$ depends on data from all of the processors in the computation. Instead, processing logic computes approximations for the equivalence class size and suppression. Further refinements for the approximations of the equivalence class size and suppression are given below.

In one embodiment, processing logic computes an approximation that is an upper bound of the equivalence class size. In this embodiment, this computation can be done without needing data from the other processors. In one embodiment, let n be the number of records. Let the set of equivalence classes be partitioned into those with size greater or equal to k and those with size less than k. If the number of records in those sets be $n_\ge$ and $n_<$, respectively. Let maxeq represent the maximum equivalence class size. Then, $$\frac{n_\ge}{maxeq} \le |E_\ge| \le \frac{n_\ge}{k}$$

$$\frac{n_<}{(k-1)} \le |E_>| \le n_<$$

where $E_\ge$ and $E_>$ are the sets of large and small equivalence classes, respectively. Since, $|E|=|E_\ge|+|E_>|$, these provide loose bounds on the total number of equivalence classes. In addition, $$\frac{n_\ge}{maxeq} + \frac{n_<}{(k-1)} \le |E| \le \frac{n_\ge}{k} + n_<$$

Also, $n_\ge+n_<$, the lower bound on $|E|$ can be rewritten as $$\frac{n-n_<}{maxeq} + \frac{n_<}{(k-1)} \le |E|$$

and rearranging terms, $$(n-n_<) \times (k-1) + n_< \times maxeq \ge |E| \times maxeq \times (k-1)$$

Solving for $n_<$ $$n_< \times (maxeq - k + 1) \le |E| \times maxeq \times (k-1) - n \times (k-1) =$$

$$(|E| \times maxeq - n) \times (k-1)$$

$$n_< \le \frac{(|E| \times maxeq - n) \times (k-1)}{(maxeq - k + 1)}$$

Thus, $n_<$ is bounded by a linear function of the number of equivalence classes. Note $(|E| \times maxeq - n) > 0$ and maxeq$-k+1 > 0$.

As described above, $|E|=|E_\ge|+|E_>|$ provides a loose bound of the total number of equivalence classes. In one embodiment, this loose bound can be substituted for the equivalence class size component of the loss function. For the suppression approximation, $n_<$ can be approximated by $$n_< \le \begin{cases} -\infty & \text{for } n \le k \\ n-k & \text{for } k+1 \le n \le (e-1)(k-1)+k \\ (e-1)(k-1) & \text{for } (e-1)(k-1)+k \le n \le (e-1)(k-1)+j \\ \frac{-(n-ej)(k-1)}{j-k+1} & \text{for } e(k-1)+j-k+1 \le n \le ej-(j-k+1) \\ -\infty & \text{for } ej-(j-k+1) < n \end{cases}$$

At step 508, for each generalization c, processing logic compares the lower component of the information loss function score with best. If lower>best, processing logic adds c to the set P and subtracts c from C. Processing logic initializes a temporary generalization set at step 510. Furthermore, processing logic performs a first inner processing loop (blocks 512-520) for each generalization in the generalization set C and a second inner processing loop (blocks 514-520) for each child of the current generalization c. At step 516, processing logic adds the generalization c to the temporary generalization set $C_0$. Processing logic, at step 518, for each parent generalization of the child, if the parent is in the set P, add the child to the set P, removes the child from the temporary generalization set $C_0$, and breaks out of the loop. The first and second inner processing loops end at step 520. At step 522, processing logic sets C to the temporary generalization set. The outer processing loop ends at step 524. At step 526, processing logic returns the candidate generalization, c.

In one embodiment, processing logic uses can compute a candidate generalization for all of the generalizations or several virtual warehouses (or execution nodes) can compute candidate generalization for a set of generalizations. In this embodiment, a virtual warehouse (or execution node) splits the generalization into a subset of generalizations and sends those generalization subsets to different virtual warehouses (or execution nodes). Each of these virtual warehouses (or execution nodes) computes a candidate generalization for that set and sends back that candidate generalization to the initial virtual warehouse (or execution node).

Figure 6:
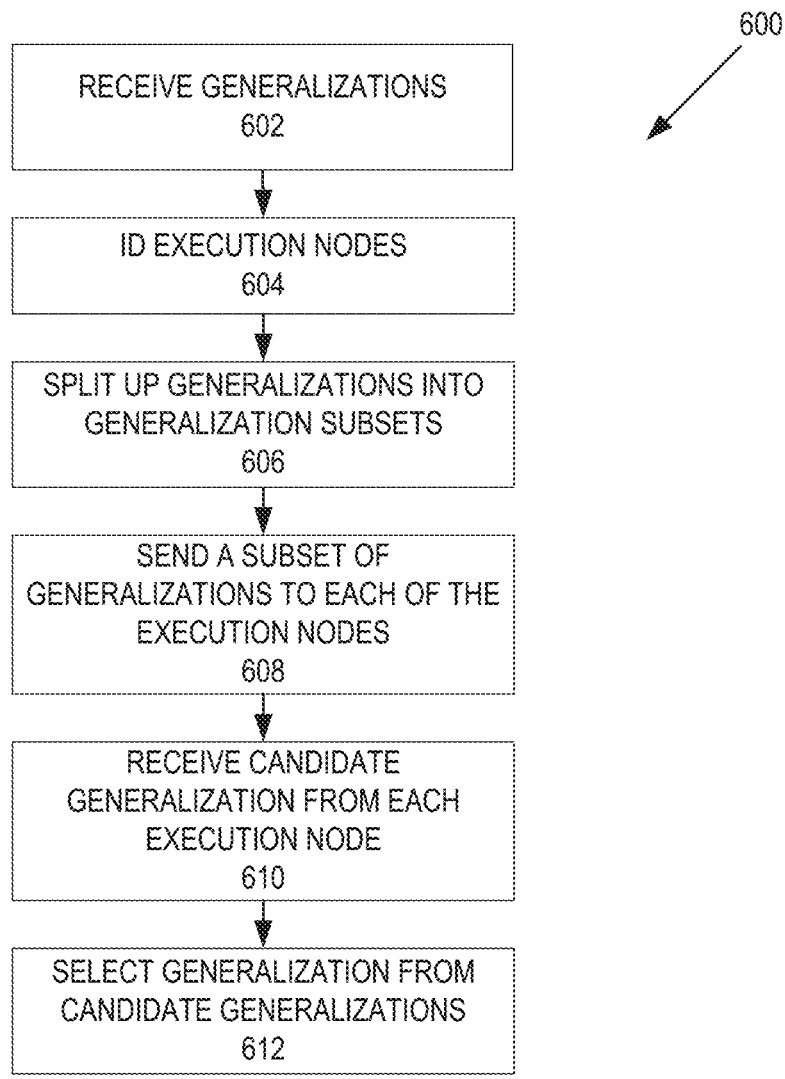
FIG. 6 is a flow diagram of one embodiment of a method to determine a candidate generalization from multiple generalizations over multiple virtual warehouses (or execution nodes).

FIG. 6 is a flow diagram of one embodiment of a method 600 to determine a candidate generalization from multiple generalizations over multiple virtual warehouses (or execution nodes). In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing 130. Method 600 may begin at step 602, where the processing logic receives the generalizations.

At step 604, processing logic identifies the group of virtual warehouses (or execution nodes) that are available to compute a candidate generalization. Based on the number of available virtual warehouses (or execution nodes), processing logic splits up generalizations into a number of subsets at step 606. While in one embodiment, the generalization subsets are of the same size, in alternative embodiments, the generalization subsets are different sizes. In one embodiment, processing logic splits the generalizations into subsets based on at least the processing capabilities of the target virtual warehouses (or execution nodes).

At step 608, processing logic sends a generalization subset to each of the available virtual warehouses (or execution nodes), where each of the virtual warehouses (or execution nodes) computes a candidate generalization. In one embodiment, each of the virtual warehouses (or execution nodes) computes a candidate generalization as described in FIG. 5 above. In one embodiment, processing logic starts with a set of candidate generalizations all at the same level. For example and in one embodiment, the starting point is the root generalization having the levels at 0. Processing logic further sets the best known value to the best value of the candidate generalizations. Because no pruning inferences are drawn between generalizations in a single level, the candidate generalizations in a given level can be evaluated at once. Furthermore, the result of each evaluation is a pair (lower, value). Send the best found solution to the minimum found so far and the set of values found by processing the candidates.

In addition, generalizations in the currently processed level are pruned if the lower bound on their utility exceeds the best value. The children of the remaining (e.g., not pruned) generalizations in the current level are processed starting with an empty candidate set for the next level: (a) if a child generalization has a parent that has been pruned, it is pruned; (b) otherwise, the child is added to the candidates for the next level. If the set of candidates for the next level is not empty, increase the level and go above where the generalizations in a given level are evaluated at once.

Processing logic receives the candidate generalization from each of the virtual warehouses (or execution nodes) at step 610. At step 612, processing logic selects an overall generalization at step 612. In one embodiment, processing logic computes the overall generalization using the information loss scoring function for these generalizations.

In one embodiment, different types of schemes can be used to compute the selected generalization that is used to determine the anonymized view of the data set. In one embodiment, processing logic can compute the anonymized view using representational state transfer (REST). For example, and in one embodiment, processing logic wraps this REST functionality in a containerized service. In another embodiment, computing the anonymized view using a trusted user-defined function (UDF), where the UDF is trusted to pull data from selected data sources. In a further embodiment, processing logic can run a UDF against data that has been staged in addition to the Java jars used to define the handler class and method. While in this example, Java is used, in alternative embodiments, a different programming language can be used (e.g., C, C++, C#, and/or any other type of programming language).

Figure 7A:
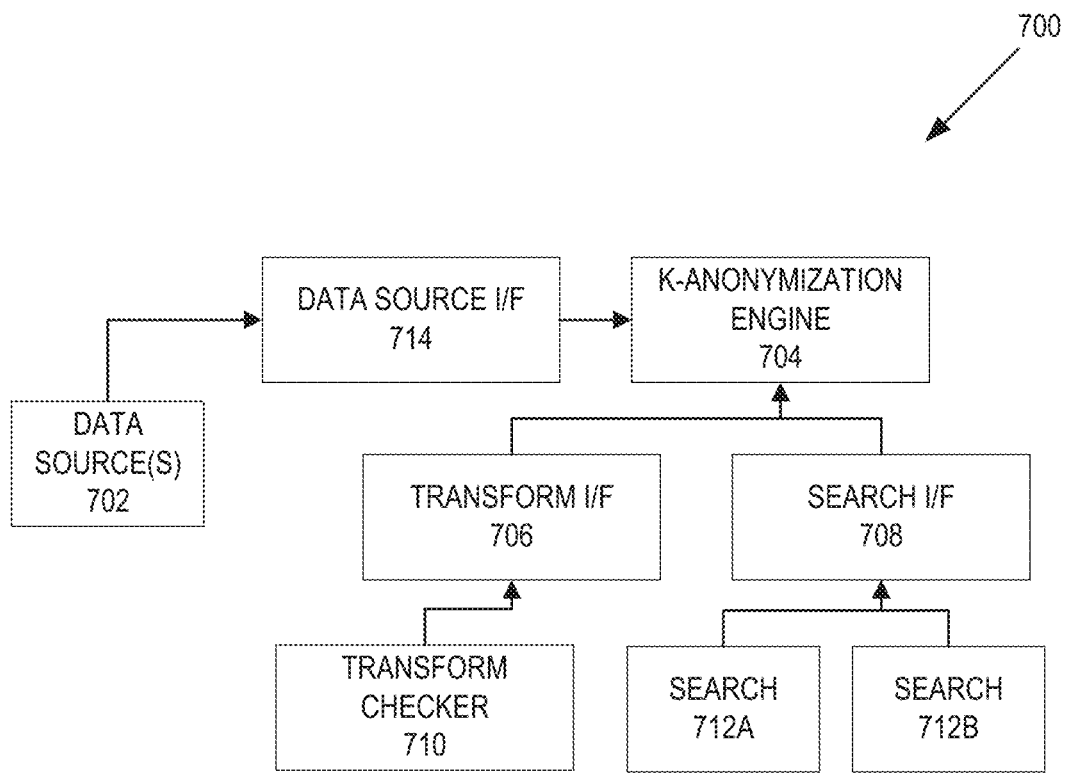
FIG. 7A-C are schematic block diagrams of embodiments of an anonymizing operation on an input data
Figure 7B:
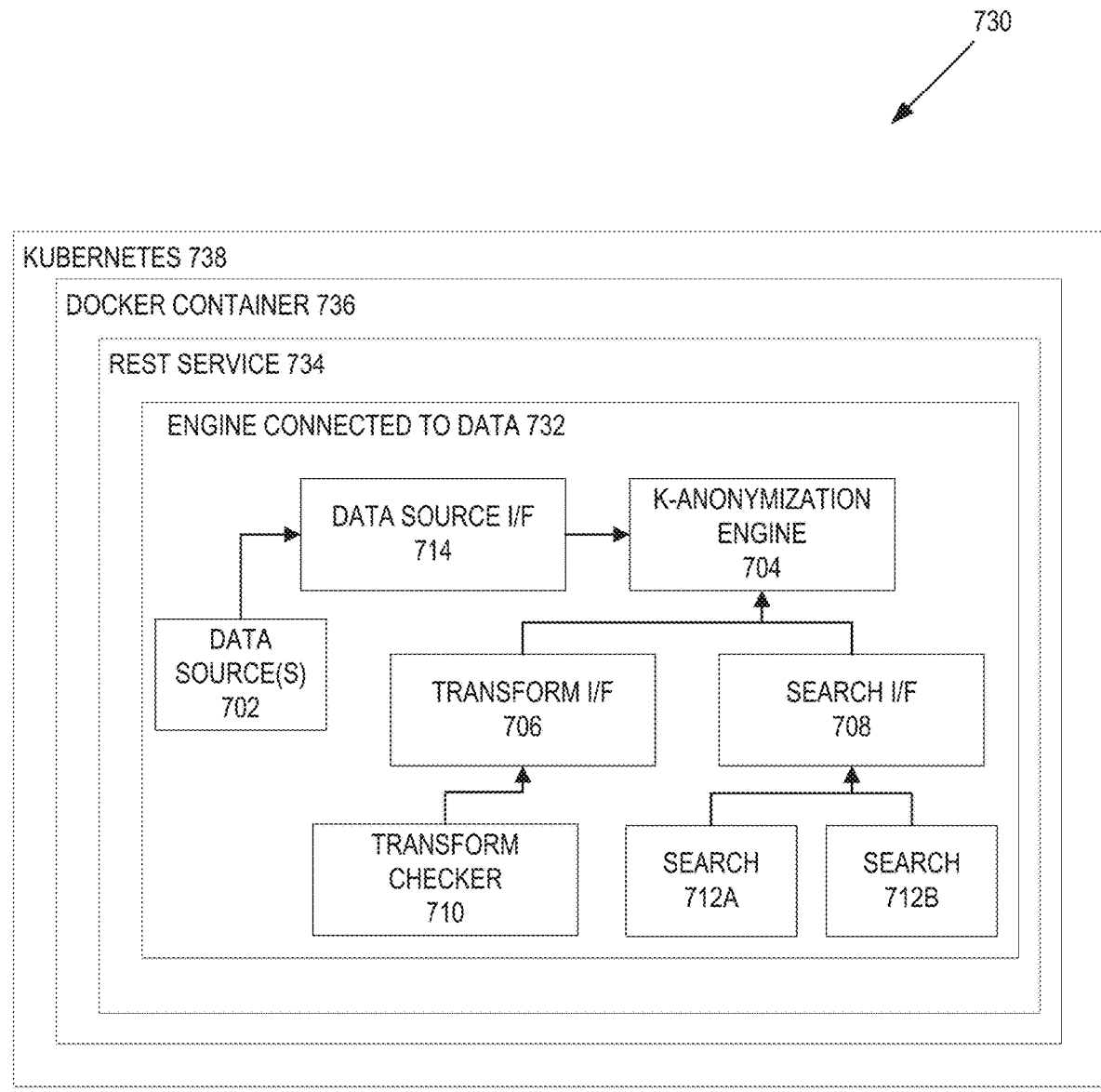
Figure 7C:
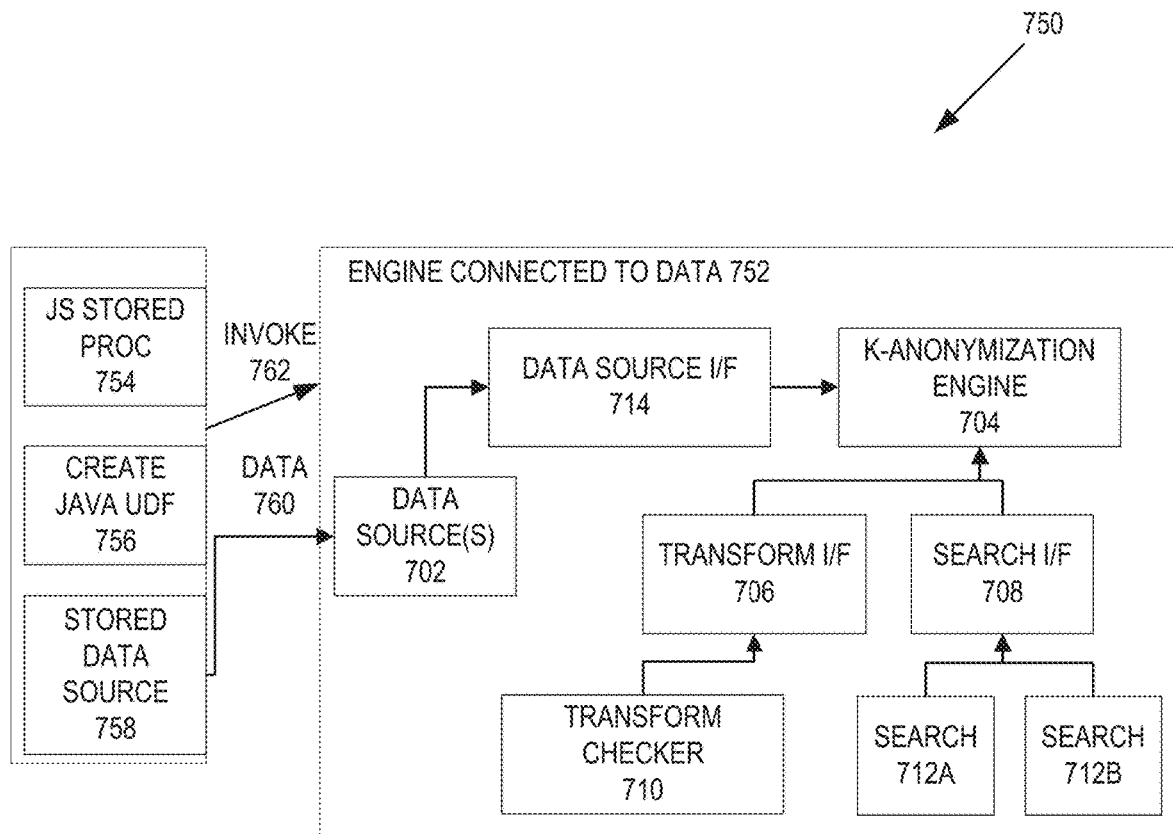

FIG. 7A-C are schematic block diagrams of embodiments of an anonymizing operation on an input data. In FIG. 7A, system 700 includes a k-anonymization engine 704 that is coupled to different interfaces: a data source interface 714, transform interface 706, and search interface 708. In one embodiment, the k-anonymization engine 704 computes an anonymized view of a data set as described in FIG. 4 above. In one embodiment, the data source interface 714 is an interface for the k-anonymization engine 704 to access the data source(s) 702. In one embodiment, the data source(s) 702 is one or more sources of data that is used to feed the k-anonymization engine 704. In this embodiment, a data source can be one or more tables of columnar data or another type of data source (dataframes or another type of data source). Furthermore, the anonymizing operation can be applied to one table at a time, even though the table may be the result of joining multiple tables. The anonymizing operation can operate on a single data table and multiple hierarchy tables. In addition, the transform interface 706 is an interface for the k-anonymization engine 704 to access the transform checker 710. In one embodiment, the transform checker 710 transforms and checks the transformed data. In this embodiment, the transform checker 710 transforms the data into integer data for the semi-identifier column data as described in FIG. 4 above. In a further embodiment, the search interface 708 is an interface for the k-anonymization engine 704 uses to search the generalizations and evaluate the generalizations used for pruning. In one embodiment, there can be one or more search facilities, such as search 712A-B. In this embodiment, depending on the value of k, the optimal solution may be high in the lattice. In this case, it may be better to use a top down approach or one that attempts to identify the appropriate level in the lattice to begin a search. Also, the bottom up approach can use pruning during loss calculations. Other approaches can use the monotonicity of k-anonymity to prune as well.

As described above, there can be different ways to package this facility for use by a user. In one embodiment, the data view anonymization can be wrapped this REST functionality in a containerized service. In FIG. 7B, the system 730 includes an engine connected to data 732, which includes a k-anonymization engine 704 coupled to the interfaces data source interface 714, transform interface 706, and search interface 708 as described in FIG. 7A above. In addition, the data source(s) 702, transform checker 710, and search 712A-B are coupled to the respective interface as described in FIG. 7A. In one embodiment, the engine connected to the data 732 is packaged as a REST service 734. In this embodiment, the service is composed of a URL reference to the data that is stored in the data source(s) 702, with the data used for the optimization being pulled form data source(s) 702 as specified by a URL. The service further includes the parameters used for the anonymization. In addition, the REST service 734 which can be further wrapped 736 in a Docker container where the service is exposed with a service port. This Docker container 736 can also be wrapped in a Kubernetes pod 738.

In addition to wrapping the anonymization service in a REST service, the anonymization can be packaged as a UDF. In FIG. 7C, the engine connected to data 752 includes an engine connected to data 732, which includes a k-anonymization engine 704 coupled to the interfaces data source interface 714, transform interface 706, and search interface 708 as described in FIG. 7A above. In addition, the data source(s) 702, transform checker 710, and search 712A-B are coupled to the respective interface as described in FIG. 7A. In addition, a Java create UDF is run with a JavaScript stored procedure 754 to create a UDF that is invoked 762 on the data in the data source(s) 702. The data is staged from the stored data source(s) 758 into the data source(s) 702. With this setup, the k-anonymization engine 704 can operate on the data to produce the anonymized view as described in FIG. 4 above.

Figure 8:
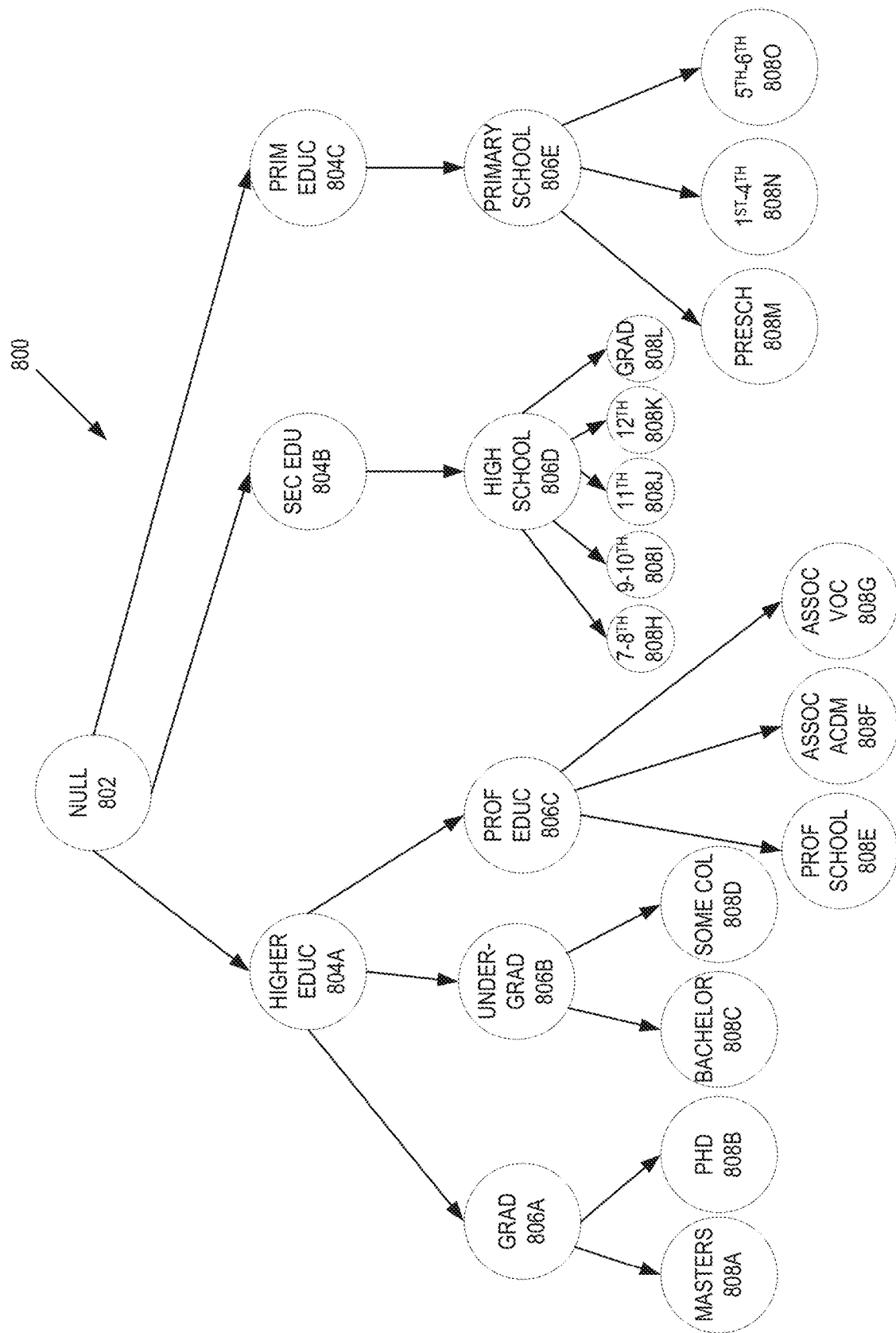
FIG. 8 is a schematic block diagram of one embodiment of an educational data hierarchy.

FIG. 8 is a schematic block diagram of one embodiment of an educational data hierarchy 800. In one embodiment, a data hierarchy is a hierarchy that relates more specific data to less specific data. In FIG. 8, the data hierarchy 800 is an educational data hierarchy that relates specific education levels to a more general education level. Data hierarchy 800 includes four levels in the hierarchy, starting with the root node 802 that has a value of NULL. The next level includes nodes 804A-C that represent a broad level of education groups, such as higher education 804A, secondary education 804B, and primary education 804C. Each of the nodes 804A-C is a child of the root node 802. In addition, each of the nodes 804A-C includes multiple children nodes that represent a more specific type of education. For example, and in one embodiment, the higher education node 804A has children nodes for graduate 806A, undergraduate 806B, and professional education 806C. In this example, graduate 806A, undergraduate 806B, and professional education 806C each represent a more specific type of higher education. In addition, each of the nodes 806AC includes a further child node. For example, and in one embodiment, the graduate node 806A has children nodes masters node 808A and Ph. D. node 808B, which each represent a more specific type of graduate education.

In addition, the undergraduate node 806B includes bachelor node 808C and some college 808D, which each represent a more specific type of undergraduate college 806B. Furthermore, the professional education node 806C includes the nodes professional school node 808E, associate of science in digital media node 808F, and associate vocational node 808G, which are each refinements of a professional education 806C.

Furthermore, the secondary node 804B has child node high school 806D, which represents a more specific type of secondary education. The high school node has five additional child nodes, 7-8$^{th}$ node 808H, 9-10$^{th}$ node 808I, 11$^{th}$ node 808J, 12$^{th}$ node 808K, and graduate node 808L, which each represent a more specific type of high school education 806D. In addition, the primary education node 804C has a child node for primary school 806E, which represents a more specific type of primary education. The primary school node 806E node has three children nodes: preschool 808M, 1$^{st}$-4$^{th}$ node 808N, and 5-6$^{th}$ node 808O, which each represent a more specific type of primary school education 806E.

In one embodiment, the data hierarchy 800 can be used to anonymize the data that is related to educational level. For example, and in one embodiment, a column that includes college level education can be anonymized by replacing a specific college level education level to "higher education." In a further embodiment, a full domain generalization can be used. In this embodiment, college level education can be replaced by higher education. In this case, secondary education and primary education is used to replace their child values.

Figure 10:
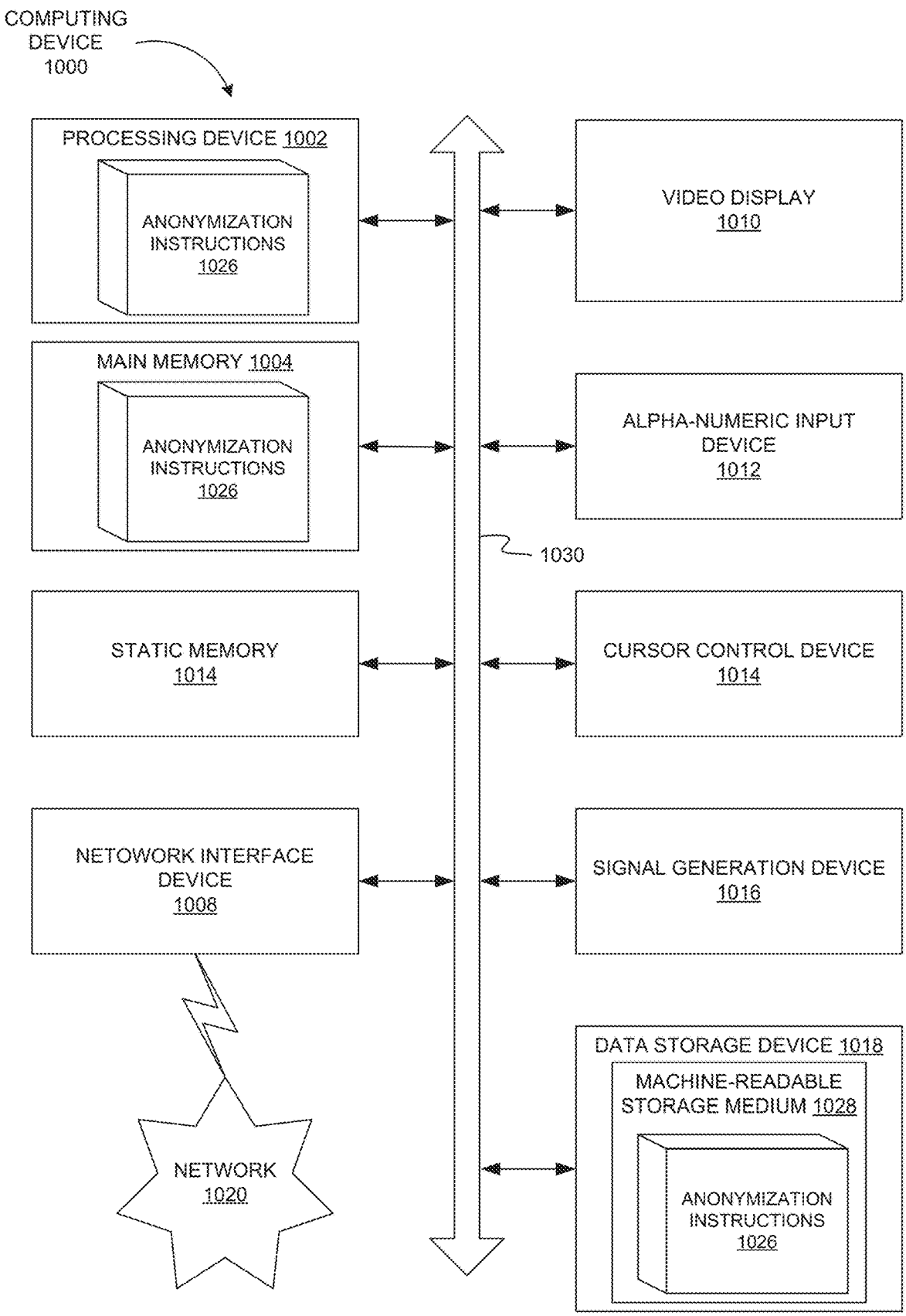
FIG. 10 is a block diagram of an example computing device that may perform one or more of the operations described herein, in accordance with some embodiments.

FIG. 10 is a block diagram of an example computing device 1000 that may perform one or more of the operations described herein, in accordance with some embodiments. Computing device 1000 may be connected to other computing devices in a LAN, an intranet, an extranet, and/or the Internet. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1010), which may communicate with each other via a bus 1030.

Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the operations described herein, in accordance with one or more aspects of the present disclosure, for performing the operations and steps discussed herein. In one embodiment, processing device 1002 represents cloud computing platform 110 of FIG. 1. In another embodiment, processing device 1002 represents a processing device of a client device (e.g., client devices 101-104).

Computing device 900 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions, e.g., instructions for carrying out the operations described herein, in accordance with one or more aspects of the present disclosure. Anonymization instructions 1026 may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "generating," "selecting," "determining," "anonymizing," "computing," "pruning," "grouping," "suppressing," "converting," "replacing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A system comprising:
a data source; and
one or more processor to,
   receive data from a data set stored in the data source, wherein the data is organized in a plurality of columns;
   generate a plurality of generalizations of the data;
   split the plurality of generalizations into a plurality of subsets of generalizations;
   send the plurality of subsets of generalizations to a plurality of execution nodes, wherein each of the execution nodes includes computational resources to compute a candidate generalization from one of the plurality of subsets of generalizations;
   receive a candidate generalization from each of the plurality of execution nodes, wherein, each of the plurality of execution nodes selects a candidate generalization from the plurality of generalizations using an information loss scoring function using at least a generalization information loss, wherein the selection of the generalization includes grouping the plurality of generalizations into a set of equivalence classes of generalizations and pruning an equivalence class of generalizations to remove a subset of generalizations from the plurality of generalizations;
   select a generalization from the plurality of candidate generalizations; and
   generate an anonymized view of the data set from the selected generalization.

2. The system of claim 1, wherein each of the plurality of columns has a corresponding privacy category.

3. The system of claim 2, wherein the privacy category comprises an identifier category.

4. The system of claim 2, wherein the privacy category comprises a quasi-identifier category.

5. The system of claim 2, wherein the privacy category comprises a sensitive category.

6. The system of claim 1, wherein the generating of the plurality of generalizations is using at least a set of data hierarchies for one or more of the plurality of columns.

7. The system of claim 6, wherein a data hierarchy is a successive grouping of data values culminating in a single value with the property that all values are successively grouped the same number of times.

8. The system of claim 1, wherein the pruning is using a monotonicity of plurality of generalizations.

9. The system of claim 1, wherein the one or more processors constructs the anonymized view further by suppressing data in a column with a privacy category of identifier.

10. The system of claim 1, wherein the anonymized view is k-anonymous for a specific k-value.

11. The system of claim 1, wherein the one or more processors to convert the data in the data set to integer data.

12. The system of claim 11, wherein the one or more processors converts the data by replacing original values of the data to be converted with an index into a set of values for the data.

13. The system of claim 11, wherein the data to be converted is data that corresponds to a column with a privacy category of quasi-identifier.

14. A non-transitory machine-readable medium storing instructions which, when executed by one or more processors of a computing device, cause the one or more processors to:
- receive data from a data set, wherein the data is organized in a plurality of columns;
- generate a plurality of generalizations of the data;
- split the plurality of generalizations into a plurality of subsets of generalizations;
- send the plurality of subsets of generalizations to a plurality of execution nodes, wherein each of the execution nodes includes computational resources to compute a candidate generalization from one of the plurality of subsets of generalizations;
- receive a candidate generalization from each of the plurality of execution nodes, wherein, each of the plurality of execution nodes selects the candidate generalization using an information loss scoring function using at least a generalization information loss and by grouping the plurality of generalizations into a set of equivalence classes of generalizations and pruning an equivalence class of generalizations to remove a subset of generalizations from the plurality of generalizations;
- select a generalization from the plurality of candidate generalizations; and
- generate an anonymized view of the data set from the selected generalization.

15. The non-transitory machine-readable medium of claim 14, wherein each of the plurality of columns has a corresponding privacy category.

16. The non-transitory machine-readable medium of claim 14, wherein the privacy category comprises an identifier category.

17. The non-transitory machine-readable medium of claim 14, wherein the privacy category comprises a quasi-identifier category.

18. The non-transitory machine-readable medium of claim 14, wherein the privacy category comprises a sensitive category.

19. The non-transitory machine-readable medium of claim 14, wherein the generating of the plurality of generalizations is using at least a set of data hierarchies for one or more of the plurality of columns.

20. The non-transitory machine-readable medium of claim 19, wherein a data hierarchy is a successive grouping of data values culminating in a single value with the property that all values are successively grouped the same number of times.

21. The non-transitory machine-readable medium of claim 14, wherein the instructions for the selection of the generalization further cause the one or more processors to:
- identify the plurality of execution nodes.

22. The non-transitory machine-readable medium of claim 14, wherein the splitting up of the plurality of generalizations is using processing capabilities of the plurality of execution nodes.

23. The non-transitory machine-readable medium of claim 14, wherein the splitting up of the plurality of generalizations are split up into equal size subsets.

24. The non-transitory machine-readable medium of claim 14, wherein the instructions for the selection of the generalization further cause the one or more processors to:
- compute the overall generalization using the information loss scoring function for these generalizations.

25. The non-transitory machine-readable medium of claim 14, wherein the instructions for the generate an anonymized view of the data set further cause the one or more processors to:
- suppress data in a column with a privacy category of identifier.

26. The non-transitory machine-readable medium of claim 14, wherein the anonymized view is k-anonymous for a specific k-value.

27. The non-transitory machine-readable medium of claim 14, wherein the instructions further cause the one or more processors to:
- convert the data in the data set to integer data.

28. The non-transitory machine-readable medium of claim 27, wherein the instructions for the data conversion cause the one or more processors to:
- convert the data by replacing original values of the data to be converted with an index into a set of values for the data.

* * * * *